United States Patent Office
3,221,592
Patented Dec. 7, 1965

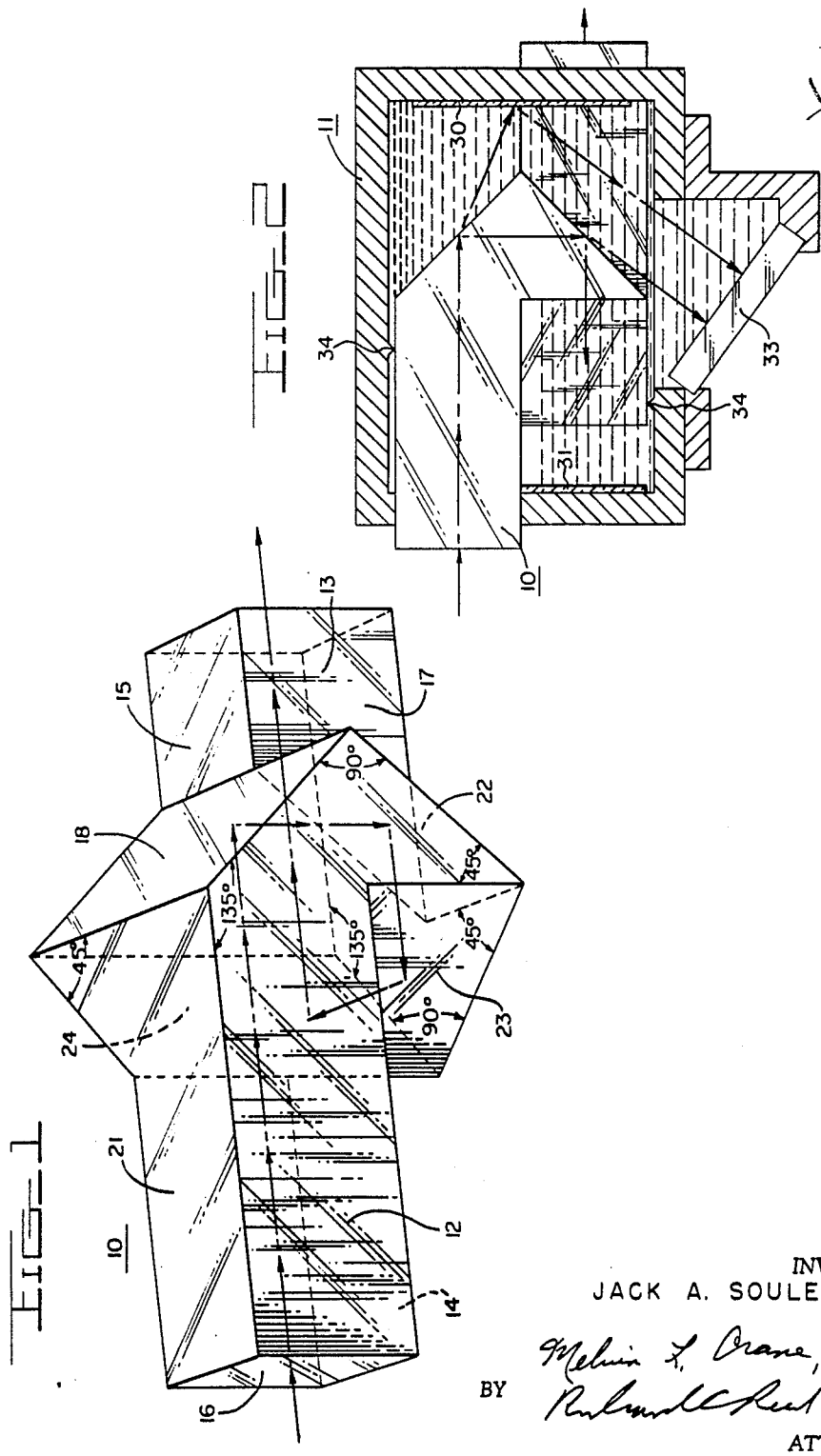

3,221,592
OPTICAL ATTENUATOR
Jack A. Soules, 870 N. Arlington Mill Drive,
Arlington, Va.
Filed Aug. 31, 1962, Ser. No. 220,922
2 Claims. (Cl. 88—1)
(Granted under Title 35, U.S. Code (1952), sec. 266)

The invention described herein may be manufactured and used by or for the Government of the United States of America for governmental purposes without the payment of any royalties thereon or therefor.

The present invention is directed to an optical attenuator and more particularly to a device for making possible precise quantitative measurements of high power monochromatic light beams.

With the advent of Lasers or Optical Masers which produce very intense light beams there was no known device capable of measuring such intense light beams. Thus, some of those who have investigated the use of Lasers have devised complicated optical systems for measuring the output thereof. These measurements are not accurate, the devices are cumbersome and require excessive space and can stand great improvements.

The optical attenuator of the present invention makes possible precise quantitative measurements of the high power light output of Lasers by use of a simple, comparatively small, relatively inexpensive light attenuator. The device makes use of internally reflecting-refracting surfaces arranged so as to produce equal attenuation for all polarizations of the incident light. The major part of the incident light is refracted away and not absorbed in the device. Thus, the output of the optical attenuator is an accurate part of the input beam.

It is therefore an object of the present invention to provide a simple, relatively inexpensive optical attenuator suitable to measure Laser outputs.

Another object is to provide a device which permits visual inspection and/or ordinary optical photography of the output of a Laser element.

Other objects and features of the invention will become apparent to those skilled in the art as the disclosure is made in the following description of the invention as illustrated in the accompanying drawing in which:

FIG. 1 is a view which illustrates the shape of a prism used in the optical attenuator; and FIG. 2 is a cross-sectional view which illustrates the optical attenuator including the prism.

Now referring to the drawing there is shown for illustrative purposes only an optical attenuator made in accordance with the teaching of the present invention. As shown a heavy flint glass prism 10 having an index of refraction of about 1.86 is enclosed within a housing 11 with an inlet end 12 and an outlet end 13 extending from opposite sides of the housing. Suitable seals, not shown for simplification of the drawing, are inserted between the inlet and outlet ends of the prism where the prism extends through the housing to prevent leakage of distilled water or a solution having an index of refraction of from about 1.29 to about 1.414 within which the prism is submerged within the housing. The index of refraction of the solution depends on the wavelength of the light being attenuated and can be changed by doping the water or solution surrounding the prism through any suitable opening in the housing wall.

The flint glass prism is made as one solid piece with a rectangular inlet 12 and outlet 13 which are square at the ends and extend in directions parallel to each other. The inlet is offset with respect to the outlet both horizontally and vertically such that the bottom face 14 of the inlet is in the same horizontal plane as the top face 15 of the outlet and the back face 16 of the inlet is in the same vertical plane as the front face 17 of the outlet. Between the inlet and outlet is located an isosceles right angle triangular section with the vertex intersecting with the upper face 15 of the outlet in a horizontal plane with the lower face 14 of the inlet. The upper face 18 of the triangular section forms an angle of 135° with the upper face 21 of the inlet and the upper face 15 of the outlet, with the lower face 22 of the right angular section intersecting with the front face 17 to close the solid. The base of the isosceles right angle triangular section is integral with the rectangular inlet at the upper portion and the lower portion is integral with a second right angle triangular section whose faces 23 and 24 intercept in a vertical plane with the back face 16 of the inlet and the front face 17 of the outlet. The face 24 intercepts with the back face 16 of the inlet and the base of the isosceles triangular section between the inlet and outlet. The face 24 extends upwardly to a plane that includes the upper face 21 of the inlet and encloses the solid with a triangular section alongside the inlet. The solid prism block forms four 45° reflecting surfaces between the inlet end 12 and the outlet end 13 and has been described by sections only to relate the surfaces relative to each other.

The light attenuator includes the above described solid heavy flint glass prism block having an index of refraction of about 1.86 which is positioned within the housing and surrounded with distilled water or a solution depending on the light frequency being attenuated. The light attenuator includes the prism, a front surface mirror 30 positioned on the wall through which the outlet end of the prism extends and a mirror 31 on the rear surface of the housing through which the inlet extends. An exit window 33 is positioned below the prism at an angle of 45° with the bottom wall in optical alignment with the front surface mirror 30 and an exit window, not shown, is in optical alignment with mirror 31. The housing is provided with spacers 34 along the inner surface thereof to space the prism from the wall to permit the solution or water to surround the prism.

In operation, the light attenuator is positioned in the output beam of a light source such as from a Laser. The light passes through the inlet and is incident on surface 18 at an angle of incidence of 45°. On striking the surface a portion of the light beam will be reflected downwardly at an angle of 45° to the surface 22 and the rest of the light beam will be refracted on passing from the prism into the solution within which the prism is immersed. The light that is refracted will pass through the solution to the front surface mirror 30. The front surface mirror will reflect the light back through the liquid solution and out through the exit window 33. The portion of light that was reflected downwardly to surface 22 will strike the surface at an angle of incidence of 45° which will be partially reflected and refracted at the surface 22. The reflected portion will be directed to the surface 23 and the refracted portion will pass through the liquid solution and out through the exit window 33. The light remaining in the prism will be both reflected and refracted at surfaces 23 and 24 as described above for the surfaces 18 and 22 and the refracted portion will be reflected by mirror 31 out through the window on the back side similar to the exit window 33 shown on the front side of the device as shown in the drawing. The light will be incident on four surfaces where it will have four reflections and refractions and the light reflected by fourth surface (24) will be directed out through the outlet end 13 where the intensity of the light emerging from the attenuator has been decreased sufficiently to be measured. Since the geometry of the inlet and outlet are the same two or more attenuators can be placed in optical contact in a series to increase the attenuation. The internal reflecting-refracting surfaces are so arranged as to produce equal attenuation for all polarizations of the incident light so that the output beam is an accurate part of the input. The major part of the light energy is refracted away and is not absorbed in the attenuator. It is important to remove the refracted light energy from the attenuator to prevent internal heating. Internal heating would change the temperature of the solution and consequently the index of refraction of the solution about the prism.

The exact attenuation of the device can be closely controlled by adding alcohol or sugar to the distilled water so as to adjust the index of refraction over the range of 1.33 to 1.39. To this end sugar concentration up to 35% can be used as well as alcohol concentration of to 50%.

Obviously many modifications and variations of the present invention are possible in the light of the above teachings. It is therefore to be understood that within the scope of the appended claims the invention may be practiced otherwise than as specifically described.

What is claimed is:
1. A light attenuator which comprises:
   a housing,
   a prismoid in said housing,
   said prismoid including a light inlet end and a light outlet end extending from said housing,
   a first light reflecting-refracting surface in optical alignment with said inlet end,
   a second light reflecting-refracting surface in optical alignment with said first reflecting-refracting surface which receives light reflected from said first surface,
   a third light reflecting-refracting surface in optical alignment with said second reflecting-refracting surface which receives light reflected from said second reflecting-refracting surface,
   a fourth light reflecting-refracting surface in optical alignment with said third reflecting-refracting surface which receives light reflected from said third reflecting-refracting surface,
   said fourth reflecting-refracting surface reflecting light out through said outlet end of said prismoid,
   a first window in said housing,
   a first mirror surface within said housing,
   said first mirror surface positioned to receive light refracted from said first reflecting-refracting surface and to reflect incident light out of said housing through said first window in said housing,
   said second reflecting-refracting surface refracting light out through said first window in said housing,
   a second window in said housing,
   a second mirror surface within said housing,
   said second mirror surface positioned to receive light refracted from said third reflecting-refracting surface and to reflect incident light out of said housing through said second window in said housing,
   said fourth reflecting-refracting surface refracting light out through said second window in said housing, and
   an optical solution within said housing and surrounding said prismoid,
   said optical solution having an index of refraction which is less than the index of refraction of said prismoid.
2. A light attenuator as claimed in claim 1 wherein:
   said index of refraction of said prismoid is of about 1.86, and
   said index of refraction of said optical solution within said housing is from about 1.33 to about 1.39.

References Cited by the Examiner

UNITED STATES PATENTS

| | | | |
|---|---|---|---|
| 2,135,531 | 11/1938 | Reichert | 88—34 X |
| 2,225,039 | 12/1940 | Diggins | 88—33 |
| 2,328,603 | 9/1943 | Bennett et al. | 88—33 |
| 2,858,727 | 11/1958 | Stamm et al. | 88—14 |
| 2,925,751 | 2/1960 | Miles | 88—33 X |
| 2,999,414 | 9/1961 | Stamm et al. | 88—1 |

FOREIGN PATENTS 861,027  12/1952  Germany.

JEWELL H. PEDERSEN, *Primary Examiner.*